W. H. HAMMOND.
CUTTING IMPLEMENT.
APPLICATION FILED SEPT. 15, 1914.
1,122,748.
Patented Dec. 29, 1914.
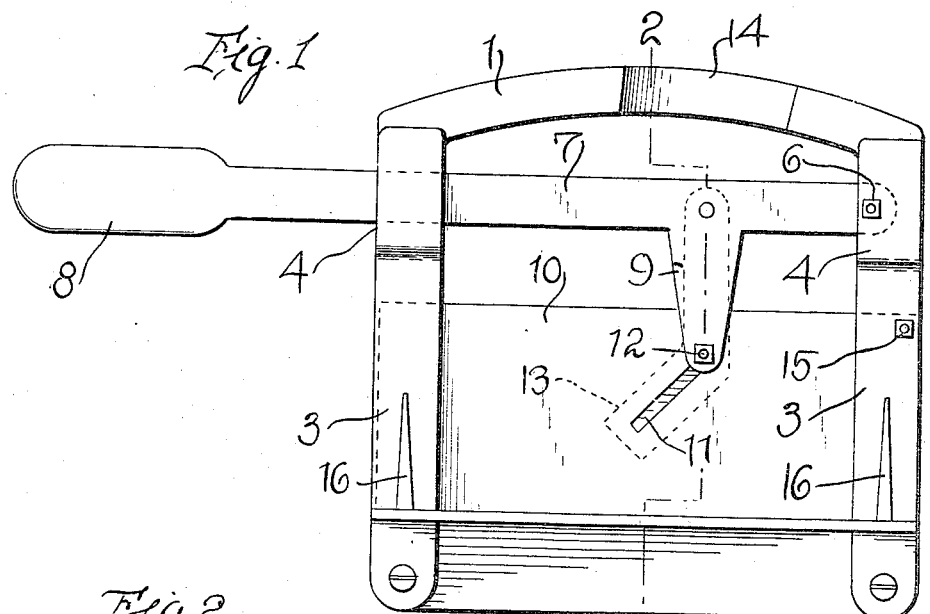
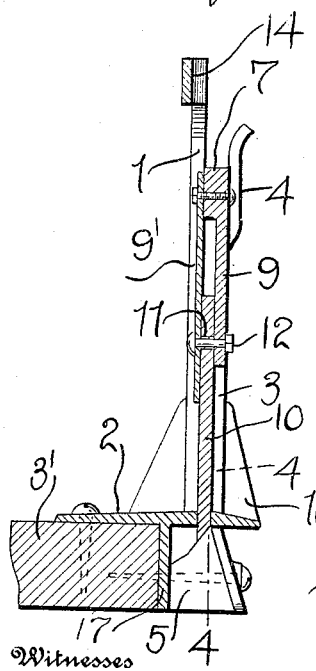
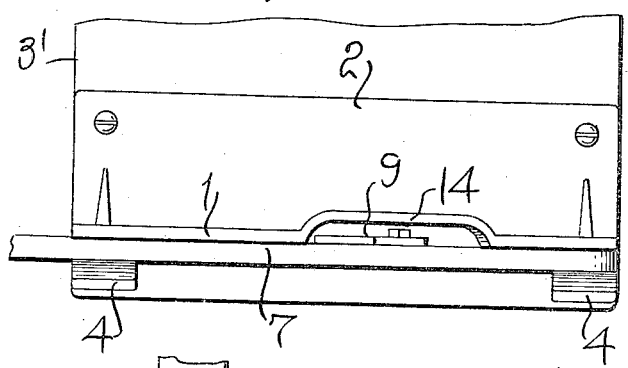
Inventor
W. H. HAMMOND

UNITED STATES PATENT OFFICE.

WILLIAM H. HAMMOND, OF CLIFFORD, MASSACHUSETTS.

CUTTING IMPLEMENT.

1,122,748.   Specification of Letters Patent.   Patented Dec. 29, 1914.

Application filed September 15, 1914. Serial No. 361,917.

*To all whom it may concern:*

Be it known that I, WILLIAM H. HAMMOND, a citizen of the United States, residing at Clifford, in the county of Bristol and State of Massachusetts, have invented certain new and useful Improvements in Cutting Implements, of which the following is a specification, reference being had to the accompanying drawings.

This invention relates to new and useful improvements in cutting implements and more particularly to what is known as a food cutter, the main object of the present invention being the provision of a cutting implement of the above character which is particularly adapted for cutting green food for poultry and stock, such as grain, corn stalks and all grasses and clovers and other grain of this character.

Another object of the present invention is the provision of a device of this character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a front elevation of a food cutter constructed in accordance with my invention. Fig. 2 is a transverse sectional view taken on the line 2—2, Fig. 1. Fig. 3 is a top plan view; and Fig. 4 is a detail sectional view taken on the line 4—4, of Fig. 2.

Referring more particularly to the drawing, 1 indicates the main frame of my improved device which is substantially rectangular in form and is provided at a point adjacent its lower end with an outwardly projecting flange 2 which is adapted to be bolted or otherwise secured to the board 3', upon which the grain, corn stalks or other material is arranged before being passed beneath the cutting knife. Arranged in spaced relation with each end of the frame 1, are the guide arms 3, the upper ends of which are provided with offset portions 4, while the lower ends thereof bear against the spacing lugs 5 which are disposed between the arms 3 and the side portions of the frame 1, to space the frame and arms from each other. Pivotally connected to a cross pin 6, which extends through one of the offset portions of one of the arms 3, is a lever 7, the free end of which is provided with a handle 8, whereby said lever may be readily grasped and actuated, as desired.

Extending downwardly from the lever 7, are the straps 9 and 9', adapted to be arranged upon opposite sides of the cutting blade 10. It will be noted that one of the straps is integrally formed with the lever, while the other thereof, as illustrated at 9' is removably secured to the opposite side of the lever. Extending through the straps and arranged within the slot 11, of the cutting blade, is a pivot pin 12, whereby when the knife is raised and lowered, said pin will move within the slot and permit of swinging movement of the knife. It will be noted that the strap 9' is curved outwardly at its lower end, as shown at 13, whereby to normally close the slot 12 and prevent the same from being clogged with the grain or other material which is being cut.

The upper longitudinal portion of the frame 1 is provided with a depression or offset 14 which is formed therein to allow the strap 9' to pass the upper portion of the frame 1, when the lever 7 is swung upwardly to a substantially vertical position. It will be noted that the knife 10 is further held in position outside the pivot pin 12 by means of a second pivot pin 15 which extends through one of the arms 3 and through one side of the frame 1. It will be noted that the arms 3 are provided at their lower ends with reinforcing rods 16, which serve to strengthen the arms and securely hold them in their effective positions.

It will be noted that the lugs 5 are cutaway at their upper ends, as shown in Fig. 2 and by having the flange 7 arranged in spaced relation with the lower ends of the arms 3, there will be considerable space beneath the cutting knife whereby to prevent small particles of material from clogging beneath the knife. It will also be noted that the upper ends of the lugs 5 form a stop to limit the downward sliding movement of the cutting blade. It will be noted that the lugs 5 also form a stop for the downward movement of the cutting knife 10.

From the above description taken in connection with the accompanying drawing, it will be readily apparent that I have provided a simple and durable cutting implement whereby grain, such as green oats and corn, etc., may be readily cut into small particles for feeding poultry, stock and the like and it will be noted that the machine itself is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

Having thus described this invention, what I claim is:—

1. The combination with a frame, of a lever having one end pivotally connected to a portion of the frame, spaced ears carried by the lever, a cutting knife having an obliquely disposed slot, a pivot carried by the ears and adapted to be arranged within said slot and one of said ears having an angular extension adapted to normally close the slot, and a handle formed on the lever, whereby to reciprocate said knife, as and for the purpose set forth.

2. The combination with a frame, of a lever having one end pivotally connected with a portion of the frame, spaced ears supported by the lever, one of said ears being formed integral therewith and the other removably connected, a cutting knife movable in the frame and having an obliquely disposed slot formed therein, a pivot bolt carried by the ears and adapted to be movably arranged within said slot, the removable ear on said lever being provided with an obliquely disposed portion adapted to normally close the slot, and a handle formed on the lever, as and for the purpose set forth.

In testimony whereof I hereunto affix my signature in the presence of two witnesses.

WILLIAM H. HAMMOND.

Witnesses:
   GEORGE M. STETSON,
   SARAH H. SURREY.

Copies of this patent may be obtained for five cents each, by addressing the "Commissioner of Patents, Washington, D. C."